United States Patent [19]

Monstrey et al.

[11] Patent Number: 4,920,154

[45] Date of Patent: Apr. 24, 1990

[54] SUBSTANTIALLY CLOSED CELL SHAPED HARD PHENOL FOAM AND METHOD FOR PREPARING THAT PHENOL FOAM

[75] Inventors: Joost Monstrey, Knokke-Heist; Bart Wallaeys, Gent, both of Belgium

[73] Assignee: Recticel, Brussels, Belgium

[21] Appl. No.: 338,072

[22] Filed: Apr. 14, 1989

[30] Foreign Application Priority Data

Jan. 3, 1989 [BE] Belgium .............................. 08900003

[51] Int. Cl.$^5$ ............................................... C08J 9/14
[52] U.S. Cl. ..................................... 521/131; 521/181
[58] Field of Search ................................ 521/131, 181

[56] References Cited

U.S. PATENT DOCUMENTS

| | | | |
|---|---|---|---|
| 3,300,419 | 1/1967 | Erickson | 521/181 |
| 3,740,358 | 6/1973 | Christie et al. | 521/181 |
| 3,741,920 | 6/1973 | Weissenfels | 521/181 |
| 4,207,400 | 6/1980 | Dahms | 521/181 |
| 4,525,492 | 6/1985 | Rastall et al. | 521/181 |

Primary Examiner—Morton Foelak
Attorney, Agent, or Firm—Sughrue, Mion, Zinn, Macpeak & Seas

[57] ABSTRACT

A phenol foam and a method for preparing substantially closed cell shaped resins on the basis of the condensation product between, on the one hand an either or not substituted phenol and/or phenol derivative and, on the other hand an aldehyde by using a blowing means for forming a hard phenol foam, whereby a physical blowing means comprising chlorine-propane is used.

8 Claims, No Drawings

SUBSTANTIALLY CLOSED CELL SHAPED HARD PHENOL FOAM AND METHOD FOR PREPARING THAT PHENOL FOAM

The invention relates to a rigid phenol foam with an essentially closed cell structure on the basis of the condensation product between, on the one hand a substituted or unsubstituted phenol and/or a phenol derivative and, on the other hand, an aldehyde by using a blowing agent for forming said rigid phenol foam.

According to the methods known until now, for preparing such closed cell shaped resins as physical blowing agents use is generally made of chlorofluoro-hydrocarbon compounds having a low boiling point.

The main object of the invention is to produce a rigid phenol foam of the above mentioned type which has a good thermal isolation and a good obsolescence behaviour in comparison with the phenol foams which are prepared by means of said classical blowing agents.

Practically the rigid phenol foam is characterized by the fact that it comprises closed cells where chloropropane and preferably 2-chloropropane with another gas or without such another gas is enclosed.

According to the invention a physical blowing agent comprising chloropropane is used for the preparation of said substantially closed cell shaped resins.

In an advantageous embodiment of the invention use is made of 2-chloropropane as a blowing agent.

Practically use is made of a physical blowing agent that consists of substantially only chloropropane.

Other particularities and advantages of the invention will become clear from the description given hereunder of some specific embodiments of the method according to the invention, for preparing said substantially closed cell shaped phenol foams.

Phenol foams are produced on the basis of the condensation product between, on the one hand, a substituted or unsubstituted phenol and/or phenol derivative, and, on the other hand, an aldehyde by using a physical blowing agent.

As phenol derivatives whether alkylated- or aryl substituted or unsubstituted mononuclear phenol compounds can be used with a general structural formula:

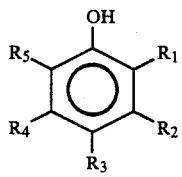

wherein $R_1$ to $R_5$ represent hydrogen atoms, alkyl groups, aryl groups, hydroxyl groups or a combination thereof. Important examples thereof are phenol, cresols, xylenols, ortho-meta- or para-substituted higher phenols, resorcinol, catechol, hydroquinone, beta phenylalkyl substituted phenols, etc. Also, polynuclear phenol derivates, such as, for example, bisphenols or tri- or tetranuclear phenol compounds can be used for preparing the concerned phenol foams. Further combinations of all those compounds can be used.

Beside the most classical formaldehyde, higher homologs such as glyoxal, acetaldehyde, benzaldehyde, furfural, chloral, etc., can also be used as aldehydes. Also products which can liberate aldehydes under the reaction circumstances can be applied e.g., para-formaldehyde).

As is generally known, use is made of the condensation between the phenol derivative and the aldehyde applied under base circumstance for the production of resol resins. Here, hydroxides, carbonates or organic amines are used as catalysts.

Preferentially less than 5% is used.

The condensation most usually occurs at temperatures between 60° C. and 150° C. and is interrupted in a time which is usually less than five hours. In the production process of resol resins water is generally added which often acts as a solving means for the aldehyde. The technology for producing those resol resins can be of the conventional type, whereby after condensation has occured the reaction is delayed by a gradual reduction of the temperature, and is completely stopped by the neutralizatin of the base catalyst. The technology can also be of the "ion exchange" type. Here, use is made of different ion exchange resins in order to make the phenol resins practically free of ions. After production, such resins often show a greater stability than the one of the above mentioned conventional type.

In the production of novolaks it is known that the ratio of aldehyde/phenol derivative is less than 1. Preferably that ratio is situated between 0.5 and 0.8. The condensation most usually occurs under acid or neutral conditions. Here, use is made of either strong acids, such as for example sulphuric acid and hydrogen chloride, or weak acids such as, e.g., oxalic acid or phosphoric acid. After the synthesis the excess water is evacuated after which the end product is isolated and can eventually be further transformed to, e.g., a resol-novolak, a solution, a derivative, etc.

It is the purpose to define with this invention a process wherein a foam structure is formed, which is caused by the presence of the chloropropane as a physical blowing agent. In that process use is essentially made of the following components: 1. A resin produced by condensation of a phenol derivative and an aldehyde in an aldehyde/phenol derivative ratio which is usually smaller than 4. 2. A physical blowing means being 1- and/or 2-chloropropane, either in pure form, or as a mixture with theknown classical blowing agents, i.e., the chlorofluoro-hydrocarbon compounds, such as for example trichlorofluoromethane, trichlorotrifluorethane, dichlorotrifluoroethane, dichloromonofluoroethane and other analogous compounds, or combinations of those substances. The chloropropane blowing agent can also be used in combination with other compounds with a relatively low boiling point or sublimation point, such as, e.g., pentane, isopentane, pentene, cyclopentane, cyclopentene, methylformate, dimethylether, diethylether. The concentration of the blowing means is dependent of the precise combination, on the one hand, and, on the other hand, of the density to be obtained. Usually 0 to 50 parts by weight blowing agent for 100 part by weights resin are used. More usually that amount is lower and comprises less than 30 parts by weight and better yet between 0.5 and 15 parts by weight.

It has been established that very good results are obtained when use is made of a blowing agent that consists of substantially only chloropropane, of which the amount thereof is adjusted between 0.5 and 15 parts by weight for 100 parts by weight resin. If use is made of chloropropane in combination with another blowing agent, the total amount of blowing agent is preferably adjusted to between 5 and 25 parts by weight for 100 parts by weight resin. 3. A catalyst which is an inorganic acid, such as sulphuric acid, phosphoric acid, etc., or a mixture thereof, or an organic strong acid such as for example arylsulfonic acids of the general type:

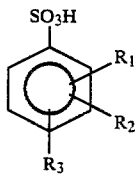

wherein $R_1$, $R_2$ and $R_3$ are alkyl groups, halogen, amine, $SO_3H$, aryl groups or represent a combination thereof. Other suitable arylsulfonic acids are the products, such as, for example, the substituted naphthalenesulfonic acids. Preferably use is made of the pure forms, or of a mixture of those compounds. As is indicated in U.S. Pat. No. 4,478,958, the determining factor for the suitability is not given by the kind of acid but by the acidity constant and compatibility of the acid with the resin.

The amount of catalyst comprises 0.5 to 40 parts by weight for 100 parts by weight resin. Usually this amount is smaller than 25 parts by weight.

In those cases where an exceptionally active phenol resin with thermohardening characteristics is applied, the supply of energy, such as, for example, in the form of a temperature rise can cause a sufficient catalytic effect so that the addition of a catalyst becomes unnecessary. Moreover, and dependent of the resin type base, a catalytic hardening of the resin can be realised.

Contrary to the resols, a catalyst has still to be added as is known from the hardening of novolaks, which catalysts can, for example, be an active phenol resin or products such as hexamethylenetetramine, paraformaldehyde, trioxane, etc. Use is here preferentially made of a concentration between 1 and 20 parts by weight catalyst with respect to 100 parts by weight novolak. 4. A tensioactive substance as an emulsion and foam stabilizer. That tensioactive compound can be of the organic type, such as, for example, the condensation products of alkylene oxides (such as, for example, ethylene oxide and propylene oxide or a combination of them) with alkylphenols (such as, for example nonylphenol, dodecylphenol, etc.). Other types of tensioactive compounds, such as, for example, siloxane-oxyalkylene copolymers, which essentially comprise Si-O-C and/or Si-C links, can also be used for that purpose. Generally use is made of amounts comprised between 0.1 and 10 parts by weight for 100 parts by weight resin. Preferentially use is made of 1 to 6 parts by weight.

In order to control the physical properties of the final product there can further be added a number of additives. Under those components the following compounds can be catalogued:

urea and/or resorcinol or derivatives thereof in order to mask the liberated amounts of aldehyde. The amounts wich are used here lie between 0 and 15 parts by weight for 100 parts by weight resin. More specifically amounts between 1 and 5 parts by weight are used;

softeners, such as for example dimethylterephthalate, dimethylisophthalate, polymeric phthalic acid esters, sulfonamides, etc. The amounts used are generally smaller than 25 parts by weight for 100 parts by weight resin;

other additives such as filling materials, colorants, etc. can be applied in this invention. The amounts which are used here can raise to 50 parts by weight for 100 parts by weight resin—and this is dependent of the type of the additive.

The invention enables one to produce phenol foam according to a method wherein the resin, the catalyst, the blowing agent, the foam stabilizer and possibly other additives are mixed by which the foam nearly immediately expands under atmospheric pressure.

The reacting mixture is brought into a mould in such a manner that due to the expansion the foam fills the mould completely and that a pressure is built up. In certain circumstances that pressure can raise to more than 100 kPa. In the production of low density foams that built up pressure usually remains under 80 kPa. Also due to the exothermicity of the reaction and the raised temperature of the mould (usually around 70° C.), there is created a hard foam plate.

A other possibility for processing the phenol resins is the continuous method. Here, the components are mixed under pressure in a mixing chamber. The mixture is applied either by an oscillating arm, or by a special distribution system, consisting, for example, of a number of mixing heads which are mounted beside each other, or by some other system where the material can be distributed in a homogeneous manner. The reacting foam is brought on an undercover, which can be of various types, and which is brought in movement by a transport belt disposed thereunder.

The expanded foam is brought into contact with an uppercover, which is brought into movement by an upper transport belt. The distance between the transport belts determines the thickness of the produced plates. Further expansion of the foam is limited by so-called pressure plates, so that a pressure is created which is generally larger than 10 kPa and preferentially nearly 40 kPa. A raised temperature at a level of the transport belts provides a faster hardening of the foams. The thus produced foams have a density which is most usually between 20 and 80 kg/m³.

The phenol foams can also be produced in blocks, whereby the expanded mixture is brought into an open mould and hardens further under atmospheric conditions.

Another method for producing phenol foam is an "in situ" foam forming. Here, the reacting mixture is brought on the surfaces to be treated with an appropriated distribution system.

Another possibility consists in injecting the expanded foam between two fixed plates, such as, for example, steel plates, which are mounted in a press, in such a manner that the complete expansion of the foam is limited. A typical application for such produced sandwich panels consists in use as a construction material.

The phenol foams can either be or not be provided with a covering. The most usual coverings are of the type:

non woven glass fibres with an organic binding means such as urea/formaldehyde, melamine/formaldehyde, polyvinylalcohols, etc.

a glass membrane with a mineral coating, bitumen, etc.

a glass membrane in combination with Al laminates.

solid covers, such as, for example, plates of gypsum, wood, percite, etc.

metal foil.

The invention relates more specifically to a method wherein a hard phenol foam can be produced, either or not covered with a cover wherein despite the whole or partial replacement of the classical chlorofluoro-hydrocarbon compounds (CFK) by chloropropane, there is created a final product with a better isolation value than can be expected from theoretically and practical considerations. There can further be established that the reduction of isolation capacity (obsolescence) due to the efflux of intracellular gas and the influx of air, is comparable for blown chloropropane and for blown CFK phenol foams. An additional advantage of the use of chloropropane as a blowing agent is that a material is created which has an identical fire behavior in comparison with the classically formed phenol foams.

The typical characteristics which are obtained are completely comparable with the one of the foams produced with the classical CFK's. The following Examples illustrate this invention. The main physical properties which have been measured herewith are:

the density (kg/m$^3$);

the hardness (kPa) according to the DIN 53421 method.

thermal conductivity (W/mK) according to the ISO 2581 method. Of all the samples a starting lambda-value has been measured (after stabilization of 1 day at 60° C.) and an lambda-value after two weeks stabilization at 110° C. has been measured. That process is an accelerated obsolescence and simulates the known obsolescence behaviour by diffusion of the gases by the cellular materials.

fire test according to NFP92-501, DIN4102, BS476 and NEN3883.

The physical properties represented in Tables 3–6 are each time average values for phenol foams produced starting from phenol resins as defined hereunder.

In Examples 1–4 use was made of different phenol resins, of which the preparation is described in U.S. No. 4,478,958 and U.S. No. 4,444,912. A typical example is phenol resin, of which the preparation is described in example 1 of U.S. No. 4,478,958 and is hereafter called "phenol resin A". The thus obtained resin shows a Brookfield viscosity of 6500 mPas (25° C.). The residual water content was 15.72%.

Phenol resins B-F

Phenol resins B-F have been produced in a same manner as phenol resin A, however, the reaction circumstances have been modified in such a manner that the resols show the characteristics given in Table 1.

TABLE 1

| Phenol resin | Viscosity (mPas) | Water content (%) | "Bubble viscosity" (by neutralising) sec.* |
| --- | --- | --- | --- |
| B | 4000 | 15,97 | 40 |
| C | 5500 | 14,23 | 50 |
| D | 6200 | 16,11 | 60 |
| E | 6900 | 17,23 | 65 |
| F | 8300 | 13,20 | 70 |

*The viscosity has been determined as described in detail in US-A 4,478,958.

Phenol resins G-J

Those phenol resins have been produced by a process as described for phenol resin A. However, the formaldehyde/phenol ratio has been changed as given in table 2.

TABLE 2

| Phenol resin | Formaldehyde/phenol |
| --- | --- |
| G | 1,05 |
| H | 1,40 |
| I | 1,80 |
| J | 2,30 |

Phenol resin K

A phenol resin condensed as described for phenol resin A. However, the reaction product has been submitted to a successive cation and anion exchange, in such a manner that a substantially ion free resin with a high stability has been obtained.

Phenol resin L

A phenol resin as described for phenol resin A. However, 6 parts by weight polymeric phthalic-acid ester for 100 parts by weight resin has been added instead of dimethylisophthalate.

EXAMPLES 1–4

In those examples the phenol foams have been produced on the basis of the phenol resin A described hereabove. Pure 2-chloropropane or mixture of the classical CFK's has been used as a blowing agent. The respective formulations are given in Table 3.

TABLE 3

Formulations for the production of phenol foams according to Examples 1–4 in comparison with the reference formulation (ref.) on the basis of the classical CFK's as blowing agents.

| Example/component | Ref. | 1 | 2 | 3 | 4 |
| --- | --- | --- | --- | --- | --- |
| phenol resin A | 100 | 100 | 100 | 100 | 100 |
| 2-chloropropane | — | 2,3 | 4,1 | 6,0 | 8,4 |
| CCl$_3$F/CFCl$_2$—CF$_2$Cl (50/50) | 16 | 11,7 | 8,1 | 4,7 | — |
| urea | 4,7 | 4,7 | 4,7 | 4,7 | 4,7 |
| foam stabilizer | 4,7 | 4,7 | 4,7 | 4,7 | 4,7 |
| catalyst (xylene sulfonic acid) | 20 | 20 | 20 | 20 | 20 |

The method followed was as given hereunder:

The desired amount of resol is weighed in a tin plated can. The exact amount of softener with silicon is added thereto. The whole is mixed until a homogeneous liquid is obtained.

This is now put in an ice bath in order to cool to a temperature of 20° C.

The acid is weighed in a plastic syringe of 50 ml. The syringe is cooled in an ice bath or in a refrigerator (approximately 6° C.).

The resol mixture is taken out of the ice bath and the exact amount of freon is added. That mixture is again cooled by continuously stirring until approximately 10° C.

The resol mixture is again mixed at a moderate revolution number and the acid is systematically added during 10 to 15 seconds. After all the acid is added, there is further mixing at a high revolution number during 5 to 10 seconds. The obtained gel is than poured into a preheated covering box. After the "cover" is brought thereon the box is put into a mould (dimensions: 33 cm×33 cm×7,5 cm), and the latter is closed by pressing the same. The whole is brought to a temperature of 65° C.

After 6 minutes the foam is taken out of the mould.

In the above described Examples 1–4 the phenol resin A is prepared as described hereabove. Experiments with 2-chloropropane as a blowing agent, in combination or not with other blowing agents were also carried out by the preparation of the phenol resins B to L, with the same additives and in the same proportions as in those Examples, whereby nearly the same results have been obtained.

TABLE 4

Physical properties of the phenol foam as produced in Examples 1-4.

| Example/properties | Ref. | 1 | 2 | 3 | 4 |
|---|---|---|---|---|---|
| Hardness (kPa) (DIN 53421) | 162 | 164 | 172 | 160 | 169 |
| Therm. conductivity (W/m.K) | | | | | |
| λ begin | 0,0156 | 0,0155 | 0,0160 | 0,0172 | 0,0170 |
| λ 2 W 110° C. | 0,0179 | 0,0173 | 0,0180 | 0,0188 | 0,0189 |
| Fire test NFP 92-501 | M2 | M2 | M2 | M2 | M2 |
| Density (kg/m$^3$) | 45,2 | 44,9 | 46,0 | 45,7 | 45,9 |

EXAMPLES 5-10

The phenol resins used in those examples were prepared as described in U.S. No. 4,681,902 and EP 0 170 357 A1.

In those examples the phenol foams were produced with a higher density on the basis of pure 2-chloropropane as blowing agent in a concentration between 1.5 and 8 parts by weight for 100 parts by weight phenol resin. The phenol foams were produced by adding 12 to 18 parts by weight acid mixture (50/50 phosphoric acid/sulphuric acid). The foams were produced in blocks with a mean dimension of 2.5 m × 1 m × 1 m. The formulation and physical properties are given in Table 5.

TABLE 5

Physical properties of the foams produced in Examples 5-10:

| Formulation prop./examp. | 5 | 6 | 7 | 8 | 9 | 10 |
|---|---|---|---|---|---|---|
| phenol resin | 100 | 100 | 100 | 100 | 100 | 100 |
| 2-chloropropane | 8 | 6 | 4 | 3 | 1,7 | 1,2 |
| foam stabilizer | 4,6 | 4,6 | 4,6 | 4,6 | 4,6 | 4,6 |
| catalyst | 17 | 16 | 15 | 14 | 13 | 13 |
| hardness (kPa) DIN 53421 | 152,6 | 163,9 | 345 | 623 | 950 | 1120 |
| Therm. conductivity (W/mK) | | | | | | |
| λ begin | 0,0170 | 0,0163 | 0,0162 | 0,0185 | 0,026 | 0,033 |
| λ 2 W 110° C. | 0,0195 | 0,0190 | 0,0190 | 0,0200 | 0,026 | 0,033 |
| Fire test NFP 92-501 | M2 | M2 | M2 | M2 | M2 | M2 |
| density (kg/m$^3$) | 34,1 | 45,7 | 63,7 | 80,9 | 130,0 | 270 |

EXAMPLE 11

In that example a phenol foam was produced on the basis of phenol resin A with a density of 45 kg/m$^3$ according to the double belt principle. The formulation used and physical properties are presented in Table 6. As upper- and undercoverings use was made of a glass membrane cover with a mineral coating.

TABLE 6

Formulation and physical properties as produced in example 11.

| Phenol resin | 100 |
|---|---|
| 2-chloropropane | 7,9 |
| Resorcinol | 3,0 |
| Foam stabiliser | 4,5 |
| Colorant | 3,0 |
| Catalyst (50/50 xylenesulfonic acid/Toluenesulfonic acid) | 18 |
| Hardness (kPa) | 182,7 |
| Density (kg/m$^3$) | 45,0 |
| Therm. conductivity (W/mK) | |
| λ begin | 0,0160 |

TABLE 6-continued

Formulation and physical properties as produced in example 11.

| λ 2 W 110° C. | 0,0190 |
|---|---|
| Fire test NFP 92-501 | M2 |

In the above described Example 11 phenol resin A was used. Experiments with 2-chloropropane as a blowing agent, in combination or not with other blowing agents, were also carried out with phenol resins B-L, with the same additives and in the same proportions as in this example, whereby substantially the same results were obtained.

Practically, it has been established that chloropropane, in combination or not with other blowing agents, can be used in a advantageous manner in all methods for preparing rigid phenol foams. In fact, and in a certain way in an expected manner, chloropropane can completely or partially without changing other parameters replace the physical blowing agents which are used in the preparation of rigid phenol foams with substantially closed cells, and that in such a manner that a high quality product is obtained with good thermal isolating properties and a good obsolescence behaviour.

Thus the invention is e.g., applicable in the methods for preparing closed cell phenol foams as described in the patent publications given hereunder: U.S. No. 4.478.958, U.S. No. 4.444.912, U.S. No. 4.165.413, GB 2.085.886, NL 8.104.537, BE 897.255, BE 897.254, BE 897.256, U.S. No. 4.681.902, EP 0.170.357, CA 1.150.200, U.S. No. 4.546.119, EP 0.066.967, CA 1.200.650, U.S. No. 4.353.994 and CA 1.100.695.

Further, the technology for preparing phenol foams as described in the following patent publications: U.S. No. 4.501.794, EP 0.154.452 and EP 0.100.647 can be applied in a very favourable manner.

The invention is in no way limited to the embodiments described hereabove and within the scope of the present invention several modifications can be taken into account as well the choice of the raw materials such as the additives for preparing the substantially closed cell shaped phenol foams the way on which the chloropropane is added as a blowing agent and the amounts thereof, either or not mixed with other blowing agent.

What we claimed is:

1. In a method for preparing a substantially closed cell shaped foam which comprises a condensation product between an unsubstituted phenol or a phenol derivative and an aldehyde using a blowing agent for forming the rigid phenolic resin foam, the improvement wherein the blowing agent comprises chloropropane.

2. A method as claimed in claim 1, wherein said physical blowing agent substantially completely consists of chloropropane.

3. A method as claimed in claim 1, wherein chloropropane together with a chlorofluoro-hydrocarbon blowing agent such as trifluoroethane or dichloromonofluoroethane is used.

4. A method as claimed in claim 1, wherein the chloropropane is used in combination with, for the forming of said condensation product, inert compounds such as pentane, isopentane, pentene, cyclopentane, cyclopentene, methylformate, dimethylether or diethylether, which compounds have a relatively low boiling point or sublimation point.

5. A method as claimed in claim 1, wherein said chloropropane is essentially 2-chloropropane.

6. A method as claimed in claim 1, wherein the amount of physical blowing agent is less than 50 parts by weight for 100 parts by weight resin.

7. A method as claimed in claim 1, wherein the amount of physical blowing agent is less than 30 parts by weight for 100 parts by weight resin.

8. A method as caimed in claim 1, wherein the amount of physical blowing agent is between 0.5 and 15 parts by weight for 100 parts by weight resin.

* * * * *